United States Patent [19]

Kosma

[11] Patent Number: 5,529,448
[45] Date of Patent: Jun. 25, 1996

[54] ADJUSTABLE HAND GRIP MOUNT FOR SECURING A MOTORCYCLE TO A TRANSPORTATION VEHICLE

[76] Inventor: Paul Kosma, 4681 Lake Cove, Walls, Miss. 38680

[21] Appl. No.: 338,042

[22] Filed: Nov. 14, 1994

[51] Int. Cl.⁶ .................................................. B61D 45/00
[52] U.S. Cl. .............................. 410/97; 248/499; 248/503
[58] Field of Search .................................. 248/503, 680, 248/505, 499, 670; 410/96, 97, 98, 99, 104, 101

[56] References Cited

U.S. PATENT DOCUMENTS 5,259,711  11/1993  Beck ........................................ 410/104
5,326,202   7/1994  Stubbs ...................................... 410/96

*Primary Examiner*—Leslie A. Braun
*Assistant Examiner*—Gwendolyn Wrenn

[57] ABSTRACT

An adjustable hand grip mount detachably connected to the hand grips of a motorcycle for engaging one or more tie-straps connected to a transportation vehicle on which the motorcycle is supported. The adjustable hand grip mount includes a telescopic frame having a pair of tubular receptacles rotably connected thereto. The hand grips of the motorcycle are received within the receptacles and the telescopic frame is locked at a selected longitudinal extension. Strap holes are defined at the opposing ends of the telescopic frame to receive the tie straps which are secured thereto by tying or by the use of hooks, clips or other connectors commonly used with such tie straps.

20 Claims, 3 Drawing Sheets

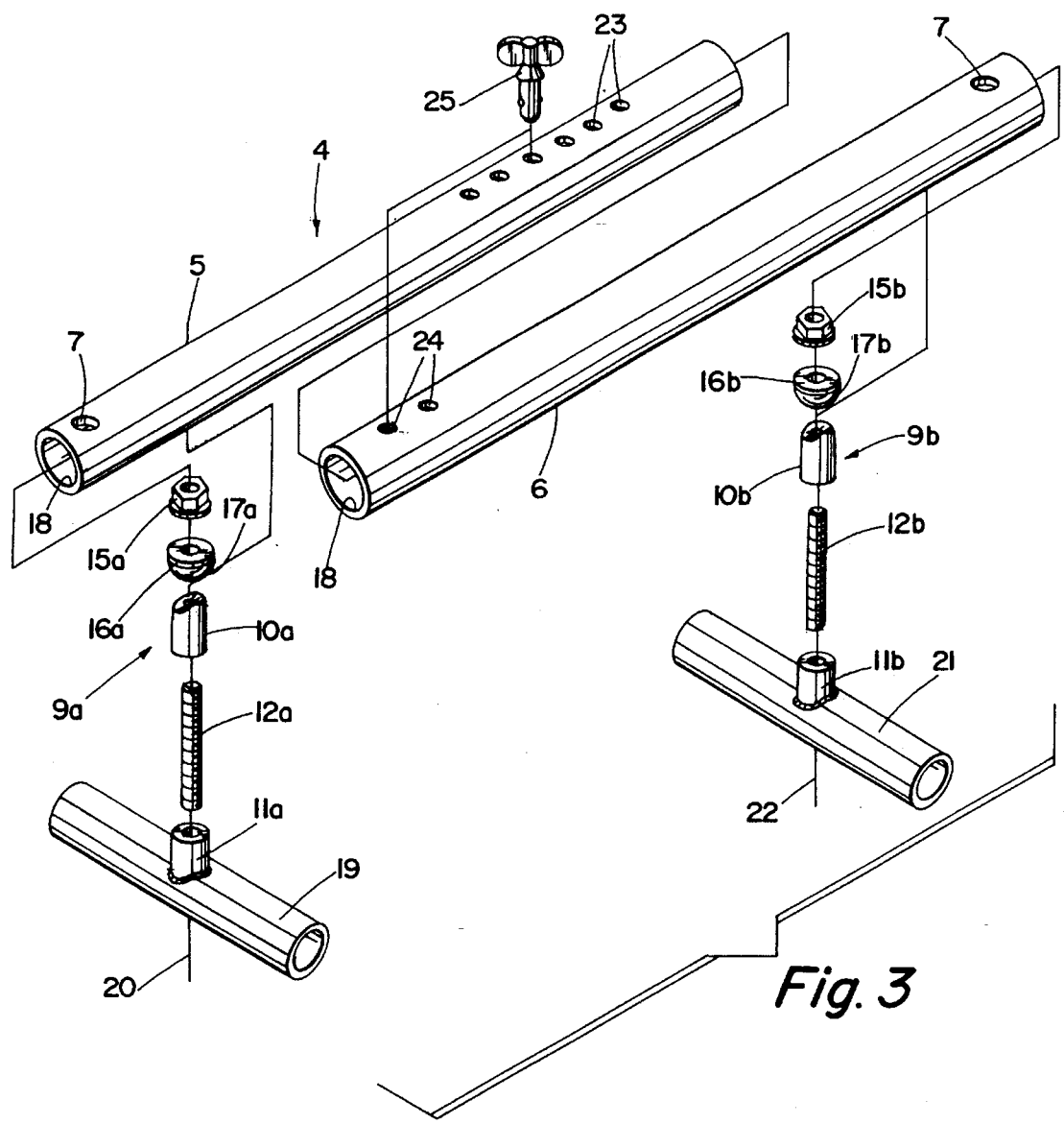
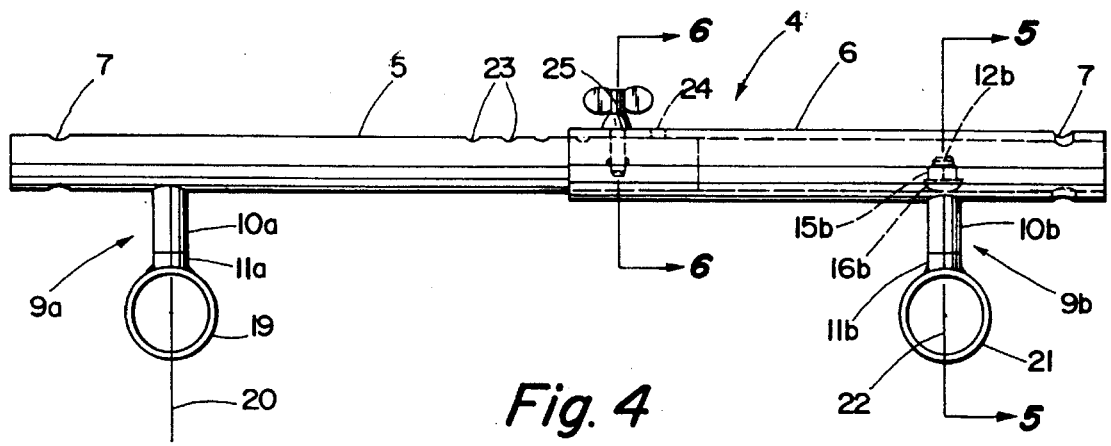

5,529,448

ADJUSTABLE HAND GRIP MOUNT FOR SECURING A MOTORCYCLE TO A TRANSPORTATION VEHICLE

FIELD OF THE INVENTION

The present invention relates to connective mounts and particularly, to mounts used to detachably secure a motorcycle to a transportation vehicle. More particularly, the present invention relates to connective mounts detachably connected to the hand grips of a motorcycle for engaging one or more tie-straps connected to the transportation vehicle.

BACKGROUND OF THE INVENTION

Motorcycles are commonly transported in the bed of a pickup truck, flat bed trailer or other general transportation vehicle having no inherent apparatus for supporting the motorcycle in an upright position. Normally the motorcycle is positioned on the bed of the transportation vehicle and secured in an upright position with tie-straps connected to the transportation vehicle and connected directly to the motorcycle.

The tie-straps are commonly attached to the motorcycle's hand grips as the hand grips are the structural components of the motorcycle positioned most vertically and laterally distal the motorcycle's center of gravity. By attaching the straps at these points, the motorcycle is better stabilized in an upright position as the supporting force is exerted on the motorcycle at points laterally equi-distal to the motorcycle's center of gravity and with a maximum leverage force relative thereto.

Difficulties arise; however, with the aforedescribed methodology in that the full supporting force is applied to the very limited area of the hand grips which are commonly made of rubber, poly-foam or other soft elastic material. Consequently, the hand grips are often damaged by the tie-straps during transport. Further, as the supporting forces pull laterally against the motorcycle, the tie-straps commonly slip off the hand grips causing the motorcycle to fall. Also, when the tie-straps slip, movement of the straps relative to the motorcycle's handle bars commonly results in damages to the mirrors, brake levers, clutch levers, gauges and other relatively delicate apparatus commonly attached to the handle bars proximate the hand grips.

SUMMARY OF THE INVENTION

It is the principle object of the present invention to provide an adjustable hand grip mount, detachably connected to the hand grips of a motorcycle, which when used with tie-straps connected to the hand grip mount will secure the motorcycle to the transportation vehicle in an upright position.

Another object of the present invention is to distribute an even supporting force across a maximum area of the hand grips to minimize damage thereto.

Yet another object of the present invention is to provide an adjustable hand grip mount connected to the hand grips in fixed relation thereto, whereby the tie-straps may be connected to the adjustable hand grip mount at a predetermined lateral and vertical distance from the motorcycle's center of gravity to provide optimal leveraged support of the motorcycle by the tie-straps and adjustable hand grip mount.

Yet another object of the present invention is to displace the tie-straps from the motorcycle hand grips, mirrors, brake levers, clutch levers, gauges and other relatively delicate apparatus commonly connected to or proximate the motorcycle's handle bars to minimize the chance of the aforementioned delicate apparatus being inadvertently damaged by the tie-straps.

Yet another object of the present invention is to provide an adjustable hand grip mount which is easily attached to a pair of co-planar hand grips of any motorcycle irrespective of the displacement or angular relation of the hand grips.

Yet another object of the present invention is to selectively deny access to the motorcycle's throttle to reduce a potential theft of the motorcycle.

These and other objects and advantages of the invention are accomplished through the use of a telescopic frame member having a tubular right frame member slidably received within a tubular left frame member and having tubular left and right receptacles rotably connected to the left and right frame members respectively, for engaging the hand grips of the motorcycle. The left and right frame members define one or more strap holes at the distal ends thereof for engaging one or more tie-straps connected to the transportation vehicle. A plurality of locking holes are formed by the left and right frame members in longitudinal displacement thereon for receiving a locking device which secures the telescopic frame member at a selected longitudinal extension. Rotational connectors are connected to the telescopic frame and to the receptacles to space the telescopic frame a predetermined distance above the motorcycle. The connectors also facilitate the rotational movement of the receptacles.

The rotational movement of the receptacles in combination with the sliding movement of the frame members permits the receptacles to receive any pair of co-planar hand grips irrespective of their displacement or angular relation. Once the hand grips are received within the receptacles, the locking device is inserted within selected locking holes to lock the present invention to the hand grips in fixed relation thereto.

The receptacles are tubular and thereby distribute the support forces exerted by the tie-straps evenly across a maximum area of the hand grips. One of the two receptacles encompasses the hand grip used as a throttle and thereby denies access thereto by a would-be thief.

BRIEF DESCRIPTION OF THE DRAWINGS

Apparatus embodying features of my invention are depicted in the accompanying drawings which form a portion of this disclosure and wherein:

FIG. 3 is an exploded perspective the preferred embodiment of the present invention;

FIG. 4 is an elevational view of the preferred embodiment of the present invention;

DESCRIPTION OF A PREFERRED EMBODIMENT

Figure 1:
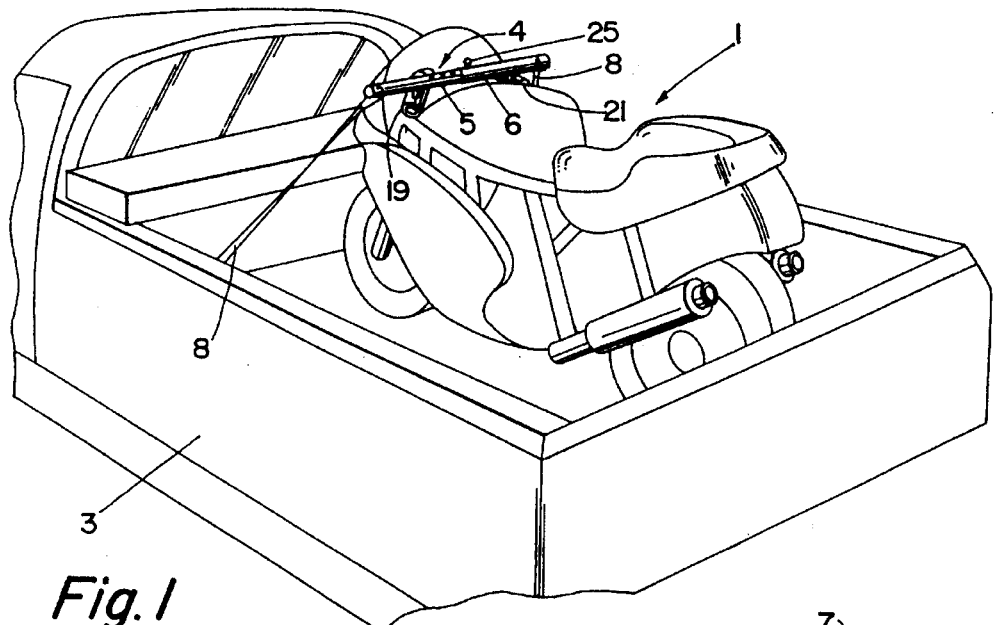
FIG. 1 is a perspective view of a preferred embodiment of the present invention attached to a motorcycle and used to support the motorcycle on a transportation vehicle.
Figure 2:
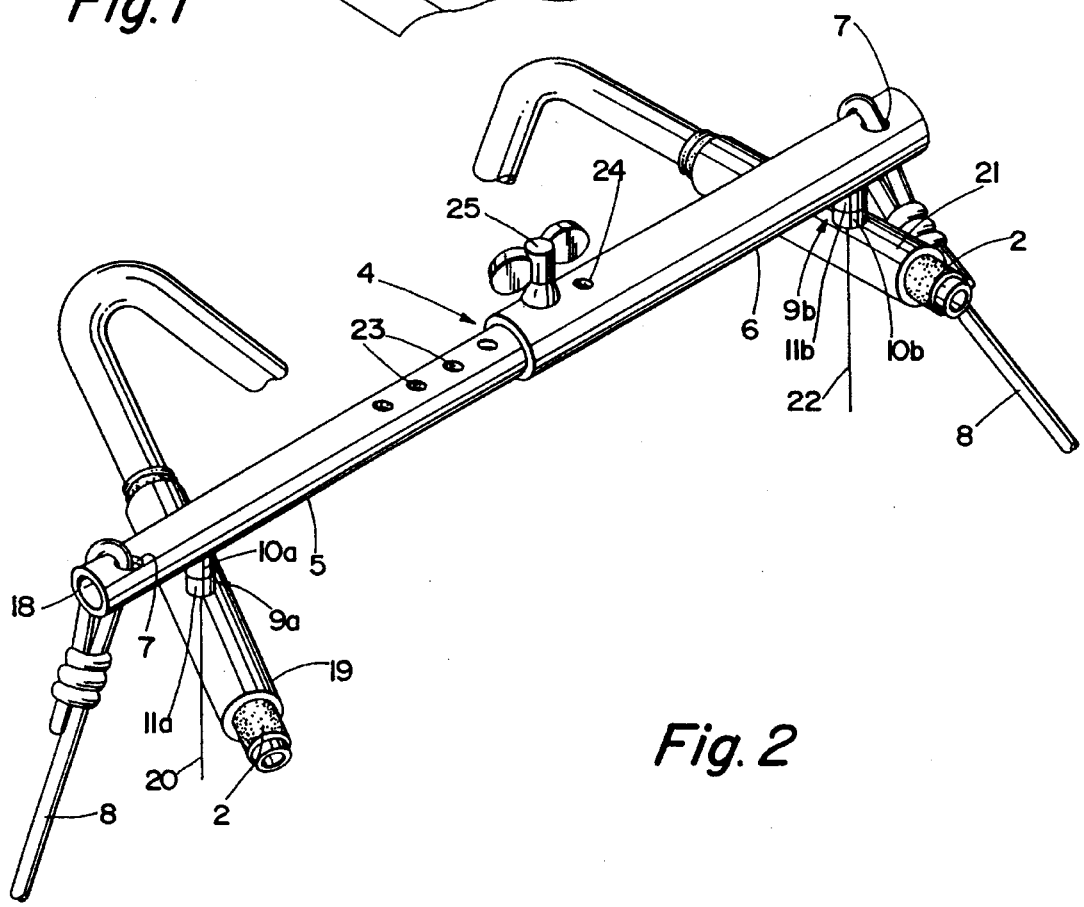
FIG. 2 is a perspective view of the preferred embodiment of the present invention attached to the handle bars of the motorcycle.

Referring to FIGS. 1 and 2 of the drawing for a clearer understanding of the invention, it should be noted that the preferred embodiment of the invention is used to secure a motorcycle 1 or other vehicle having hand grips 2 in an upright position on a transportation vehicle 3. As shown in FIGS. 2, 3 and 4, the present invention contemplates the use of a tubular telescopic frame 4 having a tubular left frame member 5 and a tubular right frame member 6 slidably received within the tubular left frame member 5. Strap holes 7 are defined by the left and right frame members 5 and 6 proximate the distal ends thereof for receiving one or more tie-straps 8 which are connected to the transportation vehicle 3.

Figure 5:
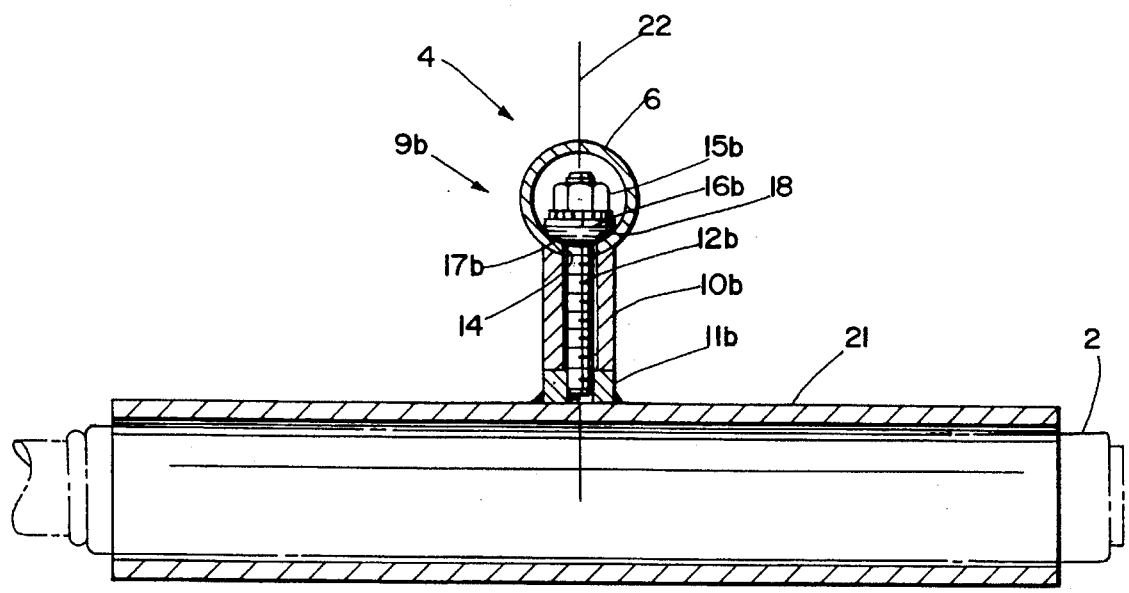
FIG. 5 is a sectional view of the preferred embodiment of the present invention taken along Line 5—5 of FIG. 4.

As shown in FIGS. 3 and 5, a pair of rotational connectors 9a and 9b are connected to the left and right frame members 5 and 6, respectively and extend perpendicularly therefrom. The rotational connectors 9a and 9b include a pair of tubular first fittings 10a and 10b respectively, connected to the left and right frame members 5 and 6, respectively, in perpendicular extension therefrom. The rotational connectors 9a and 9b also include a pair of tubular second fittings 11a and 11b, respectively which are rotably connected to the first fittings 10a and 10b, respectively, in coaxial relation thereto.

A pair of studs 12a and 12b are threadably connected, at a lower end thereof, to the second fittings 11a and 11b, respectively, and extend therefrom within the first fittings 10a and 10b, respectively in coaxial relation thereto. An upper end of stud 12a extends through a left portal 13, defined by the left frame member 5, and within the interior of the left frame member 5. An upper end of stud 12b extends through a right portal 14, defined by the right frame member 6, and within the interior of the right frame member 6.

A pair of nuts 15a and 15b are threadably connected to an upper end of studs 12a and 12b, respectively, to secure the studs 12a and 12b within the telescopic frame 4. Washers 16a and 16b receive studs 12a and 12b, respectively, and are secured thereto by nuts 15a and 15b. The washers 16a and 16b each define a convex lower surface 17a and 17b, respectively, which accommodates planar abutment of the washers 16a and 16b with an interior surface 18 of the telescopic frame 4. The nuts 15a and 15b may be selectively rotated to urge studs 12a and 12b within the telescopic frame 4 to thereby urge the second fittings 11a and 11b against the first fittings 10a and 10b respectively.

A tubular left receptacle 19 is connected to the second tubular fitting 11a in perpendicular relation thereto for rotational movement about a rotational axis 20 extending perpendicular to the left frame member 5. A tubular right receptacle 21 is connected to the second fitting 11b in perpendicular relation thereto for rotational movement about a rotational axis 22 extending perpendicular to the right frame member 6.

Figure 6:
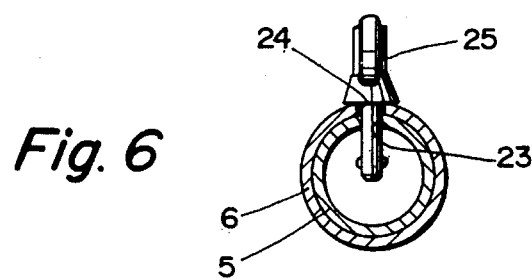
FIG. 6 is a sectional view of the preferred embodiment of the present invention taken along Line 6—6 of FIG. 5.

As shown in FIGS. 3, 4 and 6, one or more left locking holes 23 are defined by the left frame member 5 in longitudinal displacement thereon. One or more right locking holes 24 are defined by the right frame member 6 in longitudinal displacement thereon. A lockpin 25 is received within a selected one of the left locking holes 23 and a selected one of the right lock holes 24 to secure the telescopic frame 4 at a selected longitudinal extension.

Figure 7:
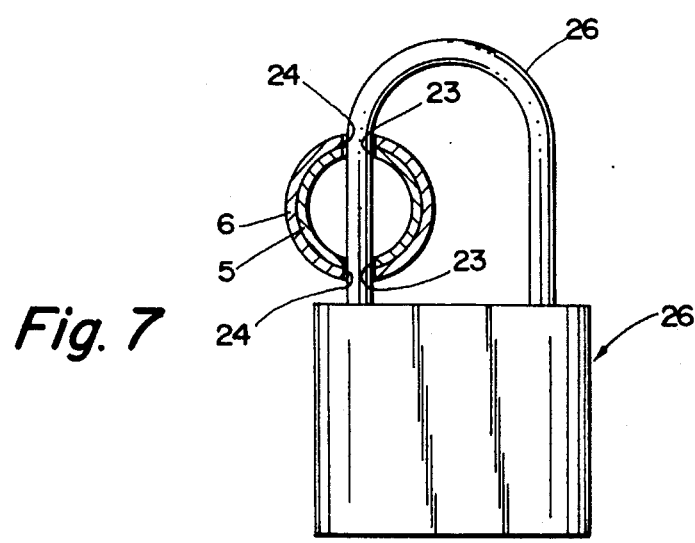
FIG. 7 is a sectional view of an alternative embodiment of the present invention showing diametrically displaced locking holes having a padlock received therein.

As shown in FIG. 7, diametric and longitudinal displacement of the locking holes 23 and 24 is contemplated by an alternative embodiment of the present invention. It is contemplated by this invention that any number of locking devices may be used to secure the telescopic frame 4 at a selected longitudinal extension. FIG. 7, shows the use of a padlock 26 received within the diametrically opposed pairs of left and right locking holes 23 and 24.

The present invention is used by disengaging the lockpin 25 or padlock 26, depending on the embodiment, from the left and right lock holes 23 and 24 to permit sliding movement of the left and right frame members 5 and 6 to a longitudinal extension which, in combination with the rotation of the left and right receptacles 19 and 21, will facilitate coaxial alignment of the left and right receptacles 19 and 21 with the hand grips 2. The left and right receptacles 19 and 21 are then moved, in conjunction with the sliding inward movement of the left and right frame members 5 and 6, to receive the hand grips 2 within the left and right receptacles 19 and 21. When the hand grips 2 are received within the receptacles 19 and 21, the lockpin 25 or padlock 26, depending on the embodiment, is received within selected ones of the left and right locking holes 23 and 24 to secure the telescopic frame 4 at a longitudinal extension thereby securing the present invention in substantially fixed relation to the hand grips 2. The nuts 15a and 15b may be rotated to urge the second fittings 11a and 11b in tightened abutment with the first fittings 10a and 10b to secure the receptacles 19 and 21 in fixed relation to the telescopic frame 4, thereby better securing the present invention to the hand grips 2 in fixed relation thereto. The tie-straps 28 are passed through the strap holes 7 and knotted or otherwise secured to the telescopic frame 4 using hooks, clips or other connectors (not shown), to secure the motorcycle 1 in an upright position on the transportation vehicle 3.

It should be noted that when the present invention is affixed to the hand grips 4 as previously described, access is denied to the hand grips 2 which are commonly used as a throttle control. If the padlock 26 or similar locking device is used to secure the telescopic frame 4, as is shown in FIG. 7, the present invention will act as a significant deterrent to a potential theft of the motorcycle 1 as the motorcycle 1 cannot be accelerated with the present invention attached thereto.

While I have shown my invention in two forms, it will be obvious to those skilled in the art that it is not so limited but is susceptible of various changes and modifications without departing from the spirit thereof.

What I claim Is:

1. Apparatus for detachably engaging a right hand grip and a left hand grip of a motorcycle to secure said motorcycle to a transportation vehicle, comprising:
   (a) a tubular left frame member having left means formed thereon adopted to be engaging one of a plurality of tie-straps connected to said transportation vehicle;
   (b) a tubular right frame member slidably received within said left frame member and having right means formed thereon engaging one of said plurality of tie-straps adopted to be connected to said transportation vehicle said tubular right frame member being detachably connected to said tubular left frame member;
   (c) left receiving means connected to said left frame member for receiving said left hand grip to secure said tubular left frame member thereto; and
   (d) right receiving means connected to said tubular right frame member for receiving said right hand grip to secure said right frame member thereto.

2. Apparatus as described in claim 1 further comprising means for selectively locking said right frame member in fixed relation to said left frame member.

3. Apparatus as described in claim 2 wherein said locking means comprises:

(a) one or more left locking holes formed by and longitudinally displaced along said left frame member;

(b) one or more right locking holes formed by and longitudinally displaced along said right frame member; and (c) a lockpin received within a selected one of said one or more right locking holes and a selected one of said one or more left locking holes for securing said right frame member in fixed relation to said left frame member.

4. Apparatus as described in claim 1 wherein said left receiving means comprises a tubular left receptacle rotatively connected to said left frame member for rotational movement about a left rotational axis extending perpendicular to said left frame member, wherein said left receptacle extends longitudinally in perpendicular relation to said left rotational axis.

5. Apparatus as described in claim 4 wherein said left receiving means further comprises:

(a) a tubular first fitting connected to said left frame member in perpendicular extension therefrom; and (b) a tubular second fitting rotatively connected to said first fitting in coaxial relation thereto, wherein said left receptacle is connected to said second fitting in perpendicular relation thereto.

6. Apparatus as described in claim 5 further comprising:

(a) a stud having an upper and a lower end, wherein said lower end is threadably connected to said second fitting in coaxial relation thereto and wherein said stud extends through said first fitting and a left portal, defined by said left frame member; and (b) means detachably connected to said upper end of said stud for securing said upper end of said stud within said left frame member.

7. Apparatus as described in claim 6 wherein said securing means comprises a nut threadably connected to said upper end of said stud, wherein said nut may be selectively rotated to urge said stud within said left frame member to urge said second fitting against said first fitting.

8. Apparatus as described in claim 1 wherein said right receiving means comprises a tubular right receptacle rotatively connected to said right frame member for rotational movement about a right rotational axis extending perpendicular to said right frame member, wherein said right receptacle extends longitudinally in perpendicular relation to said right rotational axis.

9. Apparatus as described in claim 8 wherein said right receiving means further comprises:

(a) a tubular first fitting connected to said right frame member in perpendicular extension therefrom;

(b) a tubular second fitting rotatively connected to said first fitting in coaxial relation thereto, wherein said right receptacle is connected to said second fitting in perpendicular relation thereto.

10. Apparatus as described in claim 9 further comprising:

(a) a stud having an upper end and a lower end, wherein said lower end is threadably connected to said second fitting in coaxial relation thereto and wherein said stud extends through said first fitting and a right portal defined by said right frame member; and (b) means detachably connected to said upper end of said stud for securing said stud within said right frame member.

11. Apparatus as described in claim 10 wherein said securing means comprises a nut threadably connected to said upper end of said stud, wherein said nut may be selectively rotated to urge said stud within said right frame member to urge said second fitting against said first fitting.

12. Apparatus for detachably engaging a right hand grip and a left hand grip of a motorcycle and for engaging a plurality of tie-straps used to secure said motorcycle in an upright position, comprising a tubular telescopic frame having a pair of tubular receptacles rotably connected proximate to opposite ends thereof for rotational movement about parallel rotational axes extending perpendicular to said telescopic frame, wherein a left and right hand grip are each received within one of said pair of receptacles.

13. Apparatus as described in claim 12 wherein said telescopic frame comprises a tubular left frame member and a tubular right frame member slidably received within said left frame member.

14. Apparatus as described in claim 12 further comprising means for locking said telescopic frame in a selected longitudinal extension.

15. Apparatus as described in claim 14 wherein said locking means comprises:

(a) one or more left locking holes formed by and longitudinally displaced along said left frame member;

(b) one or more right locking holes formed by and longitudinally displaced along said right frame member;

(c) a lockpin received within a selected one of said one or more left locking holes and a selected one of said one or more right locking holes for securing said telescopic frame in a selected longitudinal extension.

16. Apparatus as described in claim 14 wherein said locking means comprises:

(a) one or more pairs of left locking holes formed by and longitudinally and diametrically displaced along said left frame member;

(b) one or more pairs of right locking holes formed by and longitudinally and diametrically displaced along said right frame member;

(c) a padlock received within a selected diametrically displaced pair of said one or more pairs of left locking holes and a selected diametrically displaced pair of said one or more pairs of right locking holes for securing said telescopic frame in a selected longitudinal extension.

17. Apparatus as described in claim 12 further comprising a pair of rotational connectors each connected to said telescopic frame and to one of said pair of receptacles.

18. Apparatus as described in claim 17 wherein each of said pair of rotational connectors comprises:

(a) a tubular first fitting connected to said telescopic frame member in perpendicular extension therefrom, (b) a tubular second fitting connected to said first fitting in coaxial relation thereto, wherein one of said pair of receptacles is connected to said second fitting in perpendicular relation thereto.

19. Apparatus as described in claim 12 further comprising means formed by said telescopic frame at opposing ends thereof for engaging one or more tie-straps connected to a transportation vehicle.

20. Apparatus as described in claim 19 wherein said engaging means comprises one or more strap holes formed at opposing ends of said telescopic frame for receiving said one or more tie-straps.

\* \* \* \* \*